(12) United States Patent
Masuda et al.

(10) Patent No.: US 6,550,809 B1
(45) Date of Patent: Apr. 22, 2003

(54) AIRBAG WITH GAS PREVENTING JOINING PORTION

(75) Inventors: Yasushi Masuda, Tokyo (JP); Atsuyuki Uchiyama, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/437,403

(22) Filed: Nov. 10, 1999

(30) Foreign Application Priority Data

Nov. 18, 1998 (JP) .............................. 10-328255

(51) Int. Cl.[7] .............................................. B60R 21/16
(52) U.S. Cl. ..................................... 280/743.1; 280/729
(58) Field of Search ...................... 280/743.2, 743.1, 280/728.1, 729, 730.2

(56) References Cited

U.S. PATENT DOCUMENTS

| | | | | | |
|---|---|---|---|---|---|
| 3,756,620 A | * | 9/1973 | Radke | ...................... | 280/743.2 |
| 3,907,327 A | * | 9/1975 | Pech | ........................... | 280/729 |
| 5,100,168 A | * | 3/1992 | Horiuchi et al. | .......... | 280/728.1 |
| 5,496,061 A | * | 3/1996 | Brown | ..................... | 280/730.2 |
| 5,524,926 A | * | 6/1996 | Hirai et al. | ............... | 280/743.1 |
| 5,566,977 A | * | 10/1996 | Wipasuramonton | ...... | 280/743.1 |
| 5,570,900 A | * | 11/1996 | Brown | ........................ | 280/729 |
| 5,586,782 A | * | 12/1996 | Zimmerman, II et al. | ........................ | 280/730.2 |
| 5,678,858 A | * | 10/1997 | Nakayama et al. | ...... | 280/743.2 |
| 5,848,804 A | * | 12/1998 | White, Jr. et al. | ........ | 280/743.1 |
| 5,879,767 A | * | 3/1999 | Matsushima et al. | ...... | 428/35.2 |
| 5,901,979 A | * | 5/1999 | Schneider et al. | .......... | 280/738 |
| 5,944,345 A | * | 8/1999 | Hirai | ........................ | 280/743.1 |
| 6,220,629 B1 | * | 4/2001 | Wipasuramonton et al. | ........................ | 280/743.1 |
| 6,355,123 B1 | * | 3/2002 | Baker et al. | .................. | 156/90 |
| 6,435,553 B1 | * | 8/2002 | Wipasuramonton et al. | ........................ | 280/743.1 |
| 6,502,853 | * | 1/2003 | Keshavaraj | ................. | 280/729 |

FOREIGN PATENT DOCUMENTS

| | | |
|---|---|---|
| GB | 2 314 051 | 12/1997 |
| GB | 2 316 043 | 2/1998 |

* cited by examiner

*Primary Examiner*—Paul N. Dickson
*Assistant Examiner*—Deanna Draper
(74) *Attorney, Agent, or Firm*—Kanesaka & Takeuchi

(57) ABSTRACT

An airbag is formed of first and second main panels joined together at a joining portion to form a chamber, a first inner panel bonded to the first main panel, and a second inner panel bonded to the second main panel. The first and second inner panels are interposed between the first and second main panels, and are joined to each other at a position away from the joining portion of the first and second main panels. The airbag can securely prevent gas leakage at the joining portion of the first and second panels.

10 Claims, 3 Drawing Sheets

AIRBAG WITH GAS PREVENTING JOINING PORTION

BACKGROUND OF THE INVENTION AND RELATED ART STATEMENT

The present invention relates to an airbag for an airbag device installed in an vehicle, such as automobile and aircraft, and more particularly, to an airbag for preventing gas leakage at a joint of panels of the airbag.

Conventionally, an airbag comprising a plurality of panels which are sewn together to form an envelope-like configuration has been employed as a driver's airbag, a front passenger's airbag, a rear passenger's airbag, or a side airbag installed in an automobile, or an airbag installed in an aircraft. The airbag is inflated with gas from an inflator.

In an airbag, such as a side airbag for protecting an occupant's head as a curtain-type airbag and a side airbag for protecting an occupant during roll-over, an inner pressure thereof has to be kept high for a long period of time. Thus, it is required to surely prevent a gas leakage at a sewn portion. However, when the airbag is inflated, weaving yarns or threads are strongly pulled by a sewing yarn or thread to thereby widen interstices or make holes along the sewing yarn penetrating the panels of the airbag. The holes allow gas to leak therethrough.

To prevent the gas leakage from the sewn portion of the panels of the airbag, conventionally, as shown in FIGS. 4(a) and 4(b), silicone tapes 4 are attached to cover the sewn portion 3 of the panels 1, 2 along the peripheral edges thereof.

In the conventional airbag shown in FIGS. 4(a) and 4(b), when the gas pressure in the airbag is high, as shown in FIG. 4(b), the gas may leak from a space between the panels 1, 2.

In view of the conventional airbag, the present invention has been made, and an object of the present invention is to provide an airbag which can securely prevent a gas leakage at a joining portion of panels of the airbag.

Another object of the invention is to provide an airbag as stated above, which has a quite high bonding strength between the panels.

Further objects and advantages of the invention will be apparent from the following description of the invention.

SUMMARY OF THE INVENTION

An airbag of the present invention comprises a first main panel and a second main panel which are joined to each other at a joining portion to form a chamber, which is defined by the first and second main panels and the joining portion. The airbag is inflatable when gas is supplied into the chamber.

In the invention, the airbag further includes a first inner panel and a second inner panel interposed between the first and second main panels over the joining portion. Namely, the first inner panel is bonded to the first main panel and the second inner panel is bonded to the second main panel. The first inner panel and the second inner panel are joined to each other at a position away from the inner edge of the chamber or the joining portion.

According to the airbag, since no sewing yarn or thread penetrates the first and second main panels, there is no possibility of widening interstices or making holes of the main panels. This means that gas leakage through the holes does not occur.

In the present invention, since the first inner panel is bonded to the first main panel and the second inner panel is bonded to the second main panel, the bonding-strength between each inner panel and the corresponding main panel is sufficiently high. Also, each inner panel is bonded to the corresponding main panel over the entire surface of the inner panel, thereby making the bonding strength significantly high.

The inner panels may be joined strongly to each other, for example, by sewing. On the other hand, the first inner panel and the second inner panel may be formed by folding a piece of panel. In this case, the strength between the first inner panel and the second inner panel is significantly high.

As apparent from the above, the present invention can provide the airbag having significantly high bonding strength between the main panels.

In case the peripheral portions of the main panels are joined to each other, it is preferable that the inner panels are positioned away from the peripheral edges of the main panels for a predetermined distance, and the main panels are bonded to each other between the inner panels and the outer edges of the main panels. Even when the gas pressure in the airbag is high, the gas leakage through a space between the first main panel and the second main panel can be prevented.

In the present invention, the first main panel and the second main panel may be joined to each other not only along the peripheries of the main panels, but also about the center of the chamber. At the joint about the center of the chamber, two inner panels, preferably joined to each other by sewing, may be used.

DETAILED DESCRIPTION OF PREFERRED EMBODIMENTS

Figure 1:
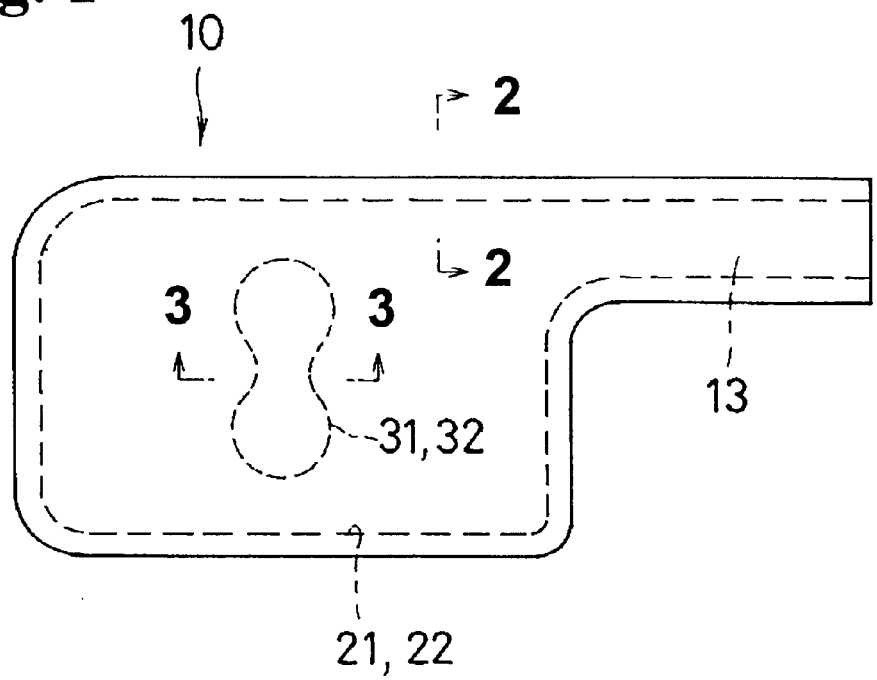
FIG. 1 is a side view showing an embodiment of an airbag of the present invention.

Hereinafter, embodiments of the present invention will be described with reference to attached drawings. FIG. 1 is a side view of an airbag according to the embodiment, and FIGS. 2, 3 are sectional views taken along lines 2—2 and 3—3 in FIG. 1.

The airbag shown in the drawings is a side airbag for protecting a head of an automobile occupant. The airbag 10 comprises a first main panel 11 and a second main panel 12, which are joined together along the peripheral edges. The airbag 10 has an envelope-like configuration at a main portion, and is inflated with gas introduced into a chamber 14 through a gas inlet 13 from an inflator (not shown).

Figure 2:
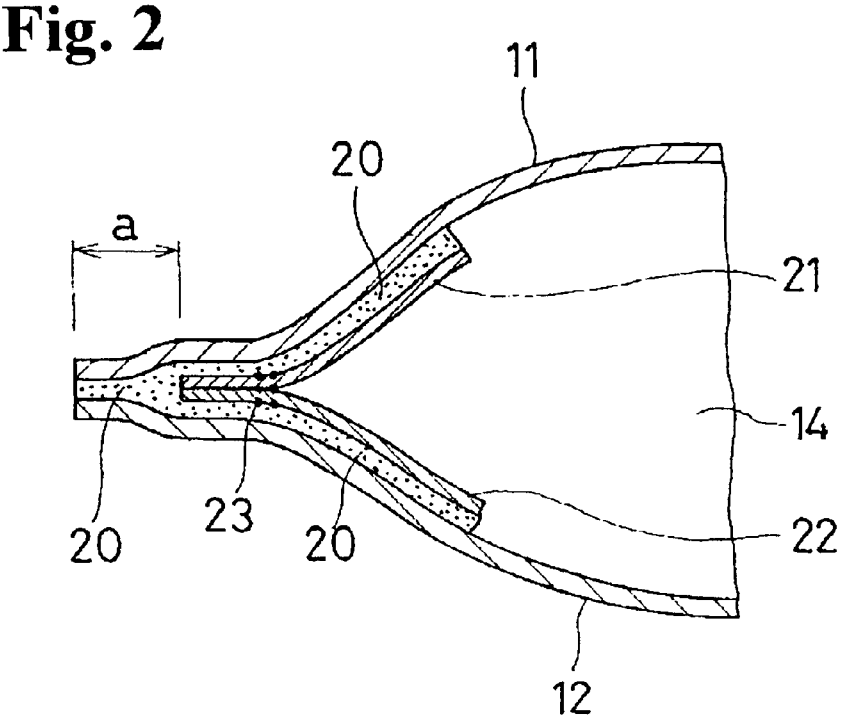
FIG. 2 is a sectional view taken along line 2—2 in FIG. 1.
Figure 3:
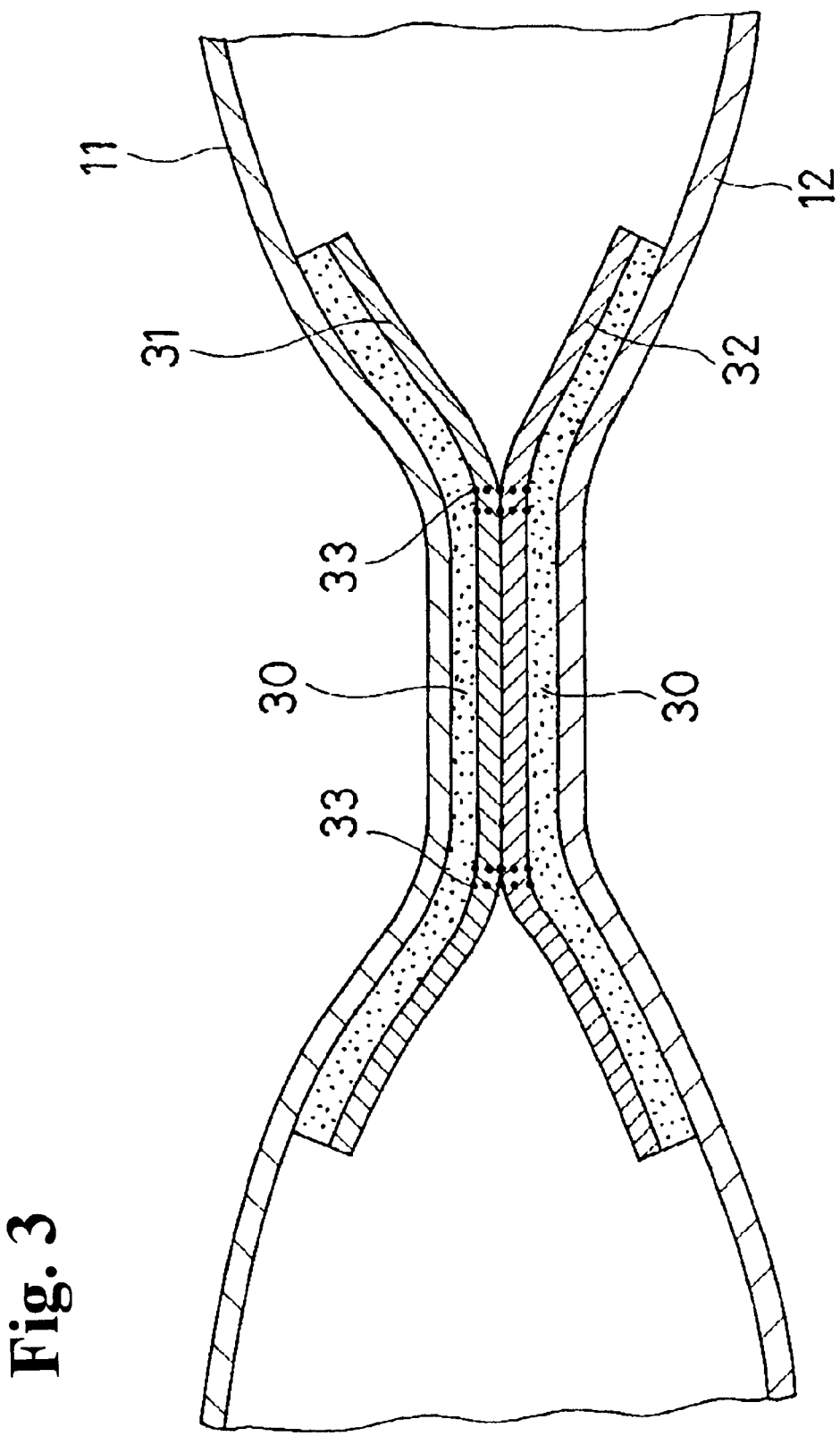
FIG. 3 is a sectional view taken along line 3—3 in FIG. 1.
Figure 4A:
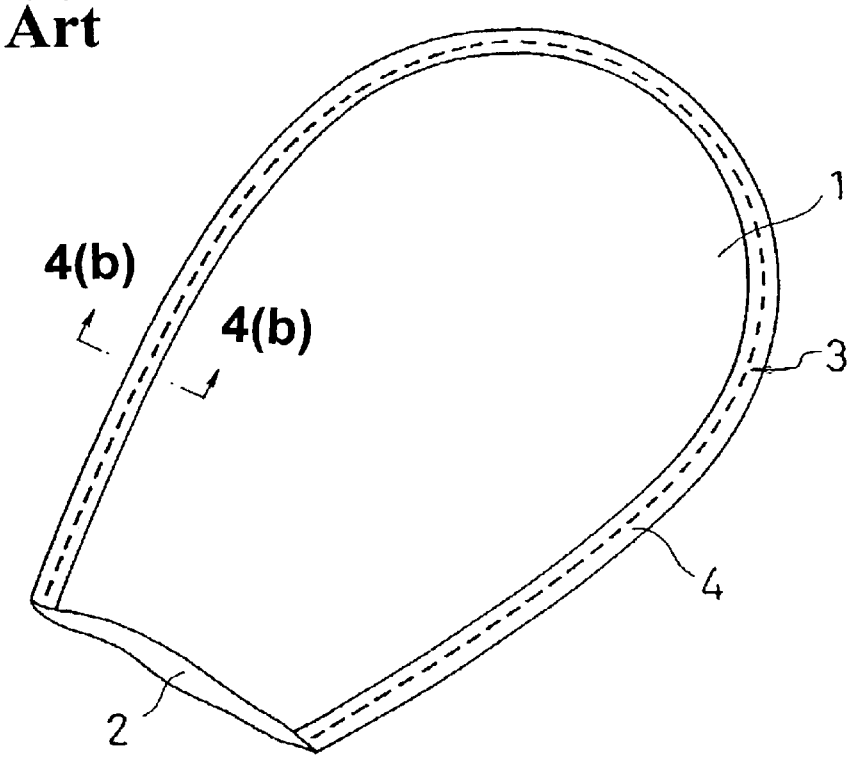
FIG. 4(a) is a perspective view showing a conventional airbag.
Figure 4B:
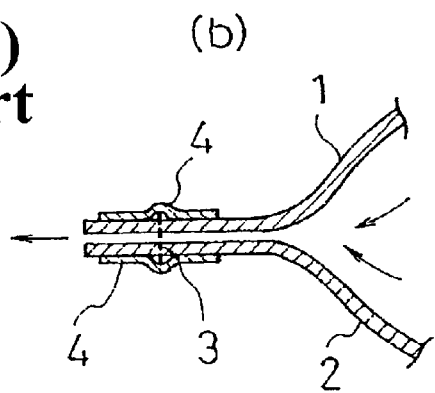
FIG. 4(b) is an enlarged sectional view taken along line 4(b)—4(b) in FIG. 4(a).

As shown in FIG. 2, interposed between the peripheral portions of the main panels 11, 12 are a first inner panel 21 and a second inner panel 22. These inner panels 21, 22 are strips extending along the peripheral portions of the airbag and are joined to each other along the outer edges, i.e. inner panel joining portion, by sewing, i.e. inner panel joining means. Numeral 23 designates a sewing yarn (seam) or thread.

The sewn inner panels 21, 22 are positioned away from the peripheral edges of the main panels 11, 12 for a predetermined distance a. By adhesives 20, the first inner panel 21 is bonded to the first main panel 11 over the entire surface thereof and the second inner panel 22 is bonded to the second main panel 12 over the entire surface thereof. The main panels 11, 12 are also bonded to each other outside the inner panels 21, 22. The aforementioned distance a is less than 100 mm, preferably from 5 mm to 15 mm.

As shown in FIG. 3, about the center of the airbag 10, by adhesives 30, an inner panel 31 is bonded to the first main panel 11 over the entire surface thereof and an inner panel 32 is bonded to the second main panel 12 over the entire surface thereof. The inner panels 31, 32 are sewn to each other by a sewing yarn or thread 33. The sewing yarn 33 is positioned away from the peripheral edges of the inner panels 31, 32.

Employed as the adhesives may be silicone adhesives, urethane adhesives, epoxy adhesives, or other adhesives.

The airbag as mentioned above is inflated by introduction of gas through the gas inlet 13.

At the joints between the main panels 11, 12, i.e. both peripheral portion and the central portion of the airbag, the gas pressure acts to separate the main panels 11, 12 from each other. However, the respective inner panels 21, 22 are bonded to the main panels 11, 12 over the entire surfaces thereof and the respective inner panels 31, 32 are bonded to the main panels 11, 12 over the entire surface thereof, and also, the inner panels 21, 22 are sewn to each other and the inner panels 31, 32 are sewn to each other. Therefore, the main panels 11, 12 are kept to be strongly joined to each other even when the gas pressure in the chamber 14 is high.

At the peripheral portion or edge of the airbag 10, the main panels 11, 12 are bonded directly to each other outside the inner panels 21, 22 by the adhesives 20, so that no gas leakage may occur between the main panels 11, 12. The stitches are formed only in the inner panels 21, 22 and 31, 32 by the sewing yarns 23 and 33, respectively, so that the stitches are not formed in the main panels 11, 12 at all. Therefore, even when the airbag is inflated, there is no possibility of widening the interstices or making holes of the main panels 11, 12 by the sewing yarns 23, 33. This means that the gas leakage through the holes does not occur.

To manufacture the airbag of the present invention, first, the inner panels 21, 22 are sewn together by the sewing yarn 23 and the inner panels 31, 32 are sewn together by the sewing yarn 33. After the adhesives are applied to the peripheral portion and the central portion of the main panel 12, the inner panels 21, 22 and the inner panels 31, 32 are put on the adhesives on the main panel 12. Then, the adhesives are applied to the peripheral portion and the central portion of the main panel 11, and the main panel 11 is put on the main panel 12 to cover the same. The main panels 11, 12 and the inner panels 21, 22, 31, 32 interposed therebetween are bonded together with a pressure by pressing the main panels 11, 12 against each other from outside. This process is an example of manufacturing the airbag of this invention. The airbag 10 may be manufactured according to a different process. To improve the bonding strength, a primer treatment may be employed if necessary.

Employed as the main panels 11, 12 may be resin-coated fabrics or resin sheets. Employed as the inner panels 21, 22, 31, 32 may be fabrics or resin sheets. In case the inner panels are resin sheets, the joining portions of the inner panels are preferably made by adhesives, not by sewing. On the other hand, the inner panels may be integrally formed together.

Though the airbag shown in FIGS. 1 through 3 is a side airbag for an automobile, the present invention may be applied to other airbags, such as a driver's airbag, a front passenger's airbag, a rear passenger's airbag and an airbag for an aircraft.

As described above, the present invention can provide an airbag which can securely prevent gas leakage at a joining portion of panels of the airbag and which has high bonding strength between the panels.

While the invention has been explained with reference to specific embodiments of the invention, the explanation is illustrative and the invention is limited only by the appended claims.

What is claimed is:

1. An airbag comprising:
   a first main panel and a second main panel joined together without sewing at a joining portion to form a chamber, said airbag being inflatable when gas is supplied into said chamber, and
   a first inner panel bonded to the first main panel without sewing and a second inner panel bonded to the second main panel without sewing so that the first and second inner panels are interposed and face each other between the first and second main panels, said first and said second inner panels being joined to each other by sewing at an inner panel joining portion without joining to the first and second main panels so that said first and second main panels are joined together at the joining portion without interposing the first and second inner panels therebetween, and said first and second inner panels are joined together at the inner panel joining portion adjacent the joining portion for the first and second main panels.

2. An airbag as claimed in claim 1, wherein said first and second main panels are bonded together at the joining portion by an adhesive, said first and second inner panels being bonded to the first and second main panels by an adhesive, respectively.

3. An airbag as claimed in claim 2, wherein said first and second inner panels are directly joined together by sewing without sewing to the first and second main panels.

4. An airbag according to claim 1, wherein said first and second inner panels are bonded to the first and second main panels by only adhesive applied therebetween, said first and second main panels being bonded together at the joining portion by adhesive only applied therebetween, which is same as the adhesive for bonding the first and second inner panels to the first and second main panels.

5. An airbag according to claim 4, wherein said joining portion is completely filled with the adhesive so that the adhesive extends from edges of the first and second main panels to inner edges of the first and second inner panels.

6. An airbag comprising:
   a first main panel and a second main panel joined together without sewing at a joining portion so that said joining portion of the first main panel and the second main panel extends along peripheral edges of the first and second main panels to form a chamber, said airbag being inflatable when gas is supplied into said chamber, and
   a first inner panel bonded to the first main panel without sewing over an entire surface thereof and a second inner panel bonded to the second main panel without sewing over an entire surface thereof so that the first and second inner panels are interposed and face each other between the first and second main panels, said first and said second inner panels being strips extending along the joining portion to be positioned away from the peripheral edges of the first and second main panels and joined to each other by sewing at an inner panel joining portion without joining to the first and second main panels so that said first and second main panels are joined to each other between the first and second inner panels and the peripheral edges of the first and second main panels.

7. An airbag as claimed in claim 6, wherein said first main panel and said second main panel are joined to each other along the peripheral edges of the first and second main panels and about a center of the chamber.

8. An airbag as claimed in claim 6, wherein said first and second main panels are joined together by an adhesive along the peripheral edges thereof.

9. An airbag according to claim 6, wherein said first and second inner panels are made of fabrics without coatings thereon, said fabrics of the first and second inner panels being bonded to the first and second main panels by only adhesive applied therebetween, said first and second main panels being bonded together at the joining portion by adhesive only applied therebetween, which is same as the adhesive for bonding the first and second main panels to the first and second inner panels.

10. An airbag according to claim 9, wherein said joining portion is completely filled with the adhesive so that the adhesive extends from edges of the first and second main panels to inner edges of the first and second inner panels.

* * * * *